US012663138B1

(12) United States Patent
Li

(10) Patent No.: US 12,663,138 B1
(45) Date of Patent: Jun. 23, 2026

(54) LIGHTING FIXTURE WITH A FOLDABLE LAMPSHADE

(71) Applicant: Shenzhen HYSIRY Technology Co., Ltd, Shenzhen (CN)

(72) Inventor: Ming Li, Shenzhen (CN)

( * ) Notice: Subject to any disclaimer, the term of this patent is extended or adjusted under 35 U.S.C. 154(b) by 0 days.

(21) Appl. No.: 19/214,686

(22) Filed: May 21, 2025

(51) Int. Cl.
*F21Y 115/10* (2016.01)
*F21V 1/06* (2006.01)

(52) U.S. Cl.
CPC ............. *F21V 1/06* (2013.01); *F21Y 2115/10* (2016.08)

(58) Field of Classification Search
CPC ............................... F21V 1/06; F21Y 2115/10
See application file for complete search history.

(56) References Cited

U.S. PATENT DOCUMENTS 6,821,002 B1 * 11/2004 Morgen .................. G09F 13/04 362/354
12,429,178 B1 * 9/2025 Su ........................... F21V 17/08
2012/0099330 A1 * 4/2012 Li ............................. F21V 1/06 362/351
2015/0029730 A1 * 1/2015 Chen ......................... F21V 1/06 362/352
2023/0324026 A1 * 10/2023 Huang .................... F21V 1/143 362/319

* cited by examiner

*Primary Examiner* — Evan P Dzierzynski

(57) ABSTRACT

A lighting fixture with a foldable lampshade comprises a lampshade and a light source assembly; the lampshade includes a foldable semi-rigid sheet material, on which crease lines for guiding folding are provided; edge areas of the lampshade abut and fit against each other in unfolded state; the lighting fixture further includes a connecting buckle, which includes a first engaging member and a second engaging member respectively disposed on two edge areas; the first engaging member and second engaging member are mutually matched and clamped to lock and fix the connecting buckle when the two edge areas abut against each other; the light source assembly includes a plurality of LED beads disposed inside the lampshade. By adopting the semi-rigid sheet material, the lampshade can maintain a certain degree of flexibility when folded, facilitating storage and transportation, and can maintain sufficient structural strength after unfolding to avoid shape deformation or instability.

9 Claims, 4 Drawing Sheets

LIGHTING FIXTURE WITH A FOLDABLE LAMPSHADE

TECHNICAL FIELD

The invention relates to the technical field of lighting, in particular to a lighting fixture with a foldable lampshade.

BACKGROUND ART

At present, traditional lighting fixtures on the market mostly have fixed lampshade structures, typically made of rigid plastics, glass, or metal materials, which are structurally rigid but lack flexibility. Such lampshades occupy a large volume during transportation and storage, are not easy to store, and are cumbersome to install or disassemble, making them unsuitable for users' portable, temporary, or repeated use scenarios. Although some foldable lighting products have emerged, their folding parts often cannot achieve stable connections due to structural design limitations, resulting in easy loosening, warping, or deformation of the lampshade edges during use, which not only affects the overall aesthetics but also poses certain safety hazards. Therefore, there is an urgent need for a lighting fixture structure with good folding performance, stable edge connections, strong aesthetics, and adaptability to a plurality of installation methods and light effects to solve the above problems in the prior art.

SUMMARY OF THE INVENTION

The purpose of the invention is to overcome the above-mentioned problems that traditional lampshades are non-foldable or prone to deformation after folding, leading to high transportation and storage costs, unstable edge connections of foldable lampshades, easy loosening, and affecting structural integrity and safety.

According to one aspect of the invention, the invention provides a lighting fixture with a foldable lampshade, including a lampshade and a light source assembly;

- the lampshade includes a foldable semi-rigid sheet material, on which crease lines for guiding folding are provided; edge areas of the lampshade abut and fit against each other in the unfolded state;
- the lighting fixture further includes a connecting buckle, which includes a first engaging member and a second engaging member respectively disposed on two edge areas; the first engaging member and the second engaging member are mutually matched and clamped to lock and fix the connecting buckle when the two edge areas abut against each other;
- the light source assembly includes a plurality of LED beads disposed inside the lampshade.

Preferably, the semi-rigid sheet material includes one or more of polyester, polyvinyl chloride, polypropylene, cellulose fiber, or polyimide.

Preferably, the connecting buckle includes a limiting device, and the limiting device includes a groove; the groove is adapted to an abutting surface of the buckle and is used to accommodate and limit the first engaging member and the second engaging member when they are clamped and matched.

Preferably, abutting surface of the edge areas is provided with anti-slip textures, which are micro-protrusions distributed in a staggered manner.

Preferably, an outer surface of the lampshade is provided with decorative patterns or textures, which present different visual effects when the lampshade is folded or unfolded. a plurality of LED beads is fixedly disposed at preset positions inside the lampshade to form specific light and shadow effects when emitting light.

Preferably, the lighting fixture further includes:

- a base, which is provided with a support rod, wherein the support rod is connected to the lampshade to support the lighting fixture; or
- a hanging device to suspend the lighting fixture at a preset position.

Preferably, when the first engaging member and the second engaging member are mutually clamped and matched, a cavity is formed at a clamping position of the first engaging member and the second engaging member; the cavity is adapted to the shape of connection position between the base or the hanging device and the lampshade, used to fix the lampshade on the base or the hanging device.

Preferably, the cavity is provided with an internal thread, and a corresponding connection part of the base or the hanging device is provided with an external thread matching therewith.

Preferably, the edge areas of the lampshade are provided with magnetic connection components, and magnetic poles of the magnetic connection components are arranged in opposite directions, magnetically attracting when the edge areas abut against each other.

Preferably, the materials of the first engaging member and the second engaging member include metal or plastic.

The invention has the following advantageous effects: the invention an achieve the foldability of the lampshade and convenient assembly and disassembly, while ensuring the stability and aesthetics of the lighting fixture during use. By adopting the semi-rigid sheet material, the lampshade can maintain a certain degree of flexibility when folded, facilitating storage and transportation, and can maintain sufficient structural strength after unfolding to avoid shape deformation or instability caused by overly soft or insufficiently rigid materials. In addition, the provision of crease lines makes the folding process of the lampshade simpler, allowing users to quickly complete folding or unfolding according to preset paths, further improving use convenience.

The design of the connecting buckle, through the mechanical cooperation of the first engaging member and the second engaging member, enables edges of the lampshade to be firmly fixed, enhancing the stability and appearance integrity of the lampshade in the unfolded state. This clamping structure not only improves the reliability of the lampshade but also effectively avoids loosening or misalignment problems caused by frequent folding or unfolding during use. At the same time, the reasonable layout of the LED beads enables the lighting fixture to achieve various light and shadow effects, enhancing the visual expressiveness of the lampshade 10, which not only meets basic lighting needs but also has a decorative function. These designs make the lighting fixture with a foldable lampshade of this embodiment have great advantages in both functionality and decorativeness, suitable for lighting fixture products in different occasions and needs.

BRIEF DESCRIPTION OF DRAWINGS

In order to illustrate the preferred embodiment of the invention or the technical scheme more clearly, the technical scheme of the preferred embodiment or the figures required by the prior art is further described briefly. Obviously, only partial embodiments of the invention are shown and the actual structure is not limited thereto. It is to be understood by those skilled in the art that other drawings can be obtained based on the drawings of the invention with non-creative labor.

As shown in the accompanying drawings: 100 lighting fixture; 10 lampshade; 11 crease line; 12 edge area; 20 connecting buckle; 21 first engaging member; 22 second engaging member; 23 limiting device; 24 cavity; 25 internal thread; 26 groove; 30 base; 31 external thread; 32 support rod.

SPECIFIC EMBODIMENT OF THE INVENTION

To facilitate understanding of the invention, the following provides a more comprehensive description with reference to the related drawings, which illustrate preferred embodiments of the invention. It should be noted that when an element is referred to as being "fixed to" another element, it can be directly on the other element or there can be an intermediate element. When an element is considered to be "connected" to another element, it can be directly connected to the other element or there can be an intermediate element simultaneously. The terms "vertical," "horizontal," "left," "right," and similar expressions used herein are for illustrative purposes only.

Unless otherwise defined, all technical and scientific terms used herein have the same meaning as commonly understood by those skilled in the art The terms used in the specification of the invention are for describing specific embodiments only and are not intended to limit the invention.

Figure 1:
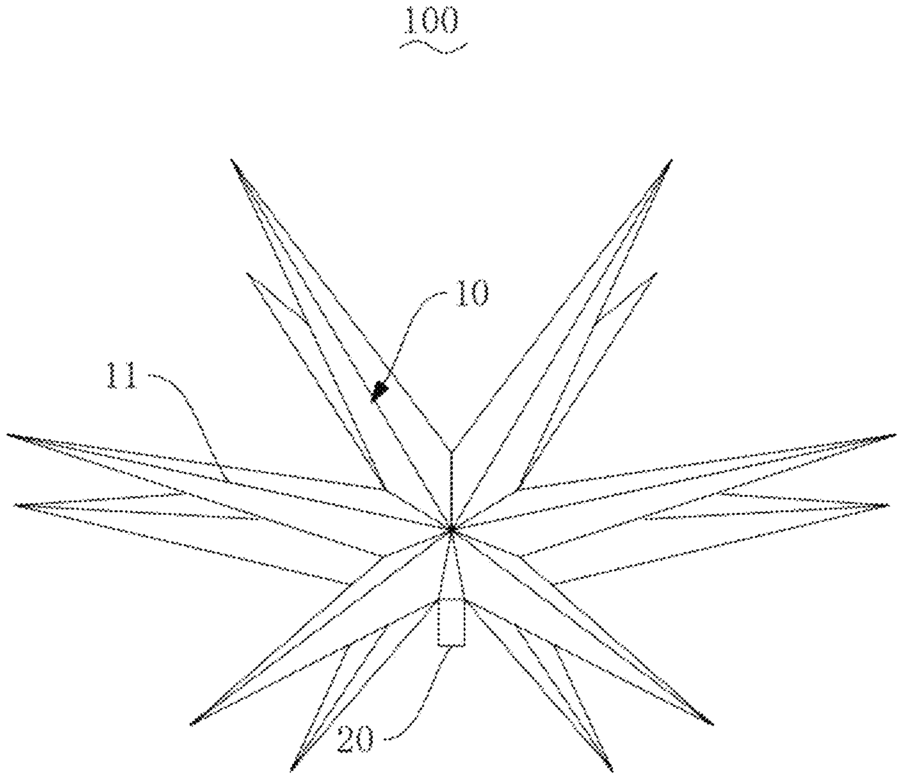
FIG. 1 is a schematic diagram of the unfolded external appearance of a lighting fixture with a foldable lampshade according to an embodiment of the invention.
Figure 2:
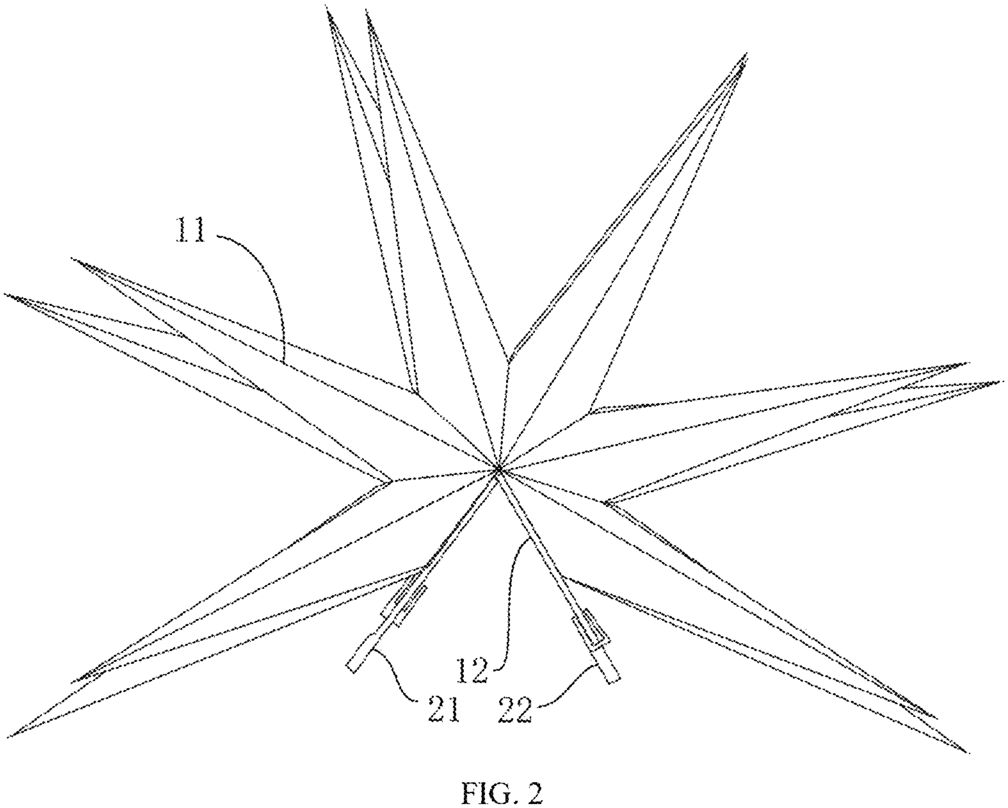
FIG. 2 is a schematic diagram of the folded external appearance of a lighting fixture with a foldable lampshade according to an embodiment of the invention.
Figure 3:
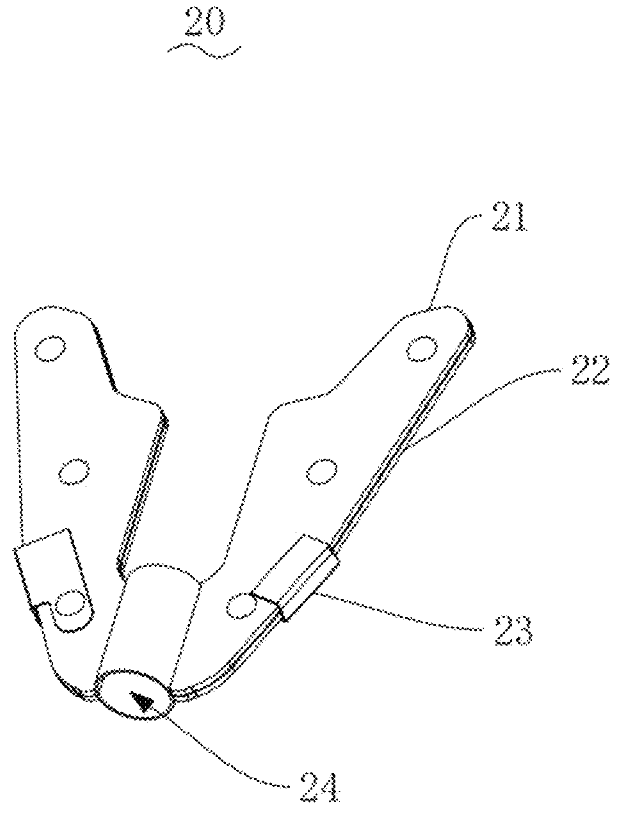
FIG. 3 is a schematic diagram of the external appearance of the connecting buckle according to an embodiment of the invention.
Figure 4:
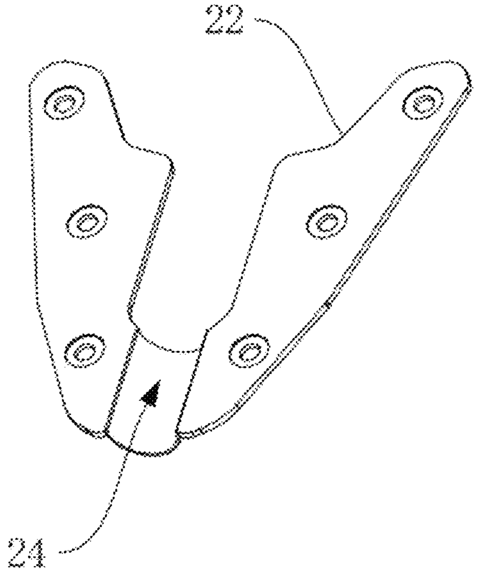
FIG. 4 is a schematic diagram of the external appearance of the second engaging member according to an embodiment of the invention.
Figure 5:
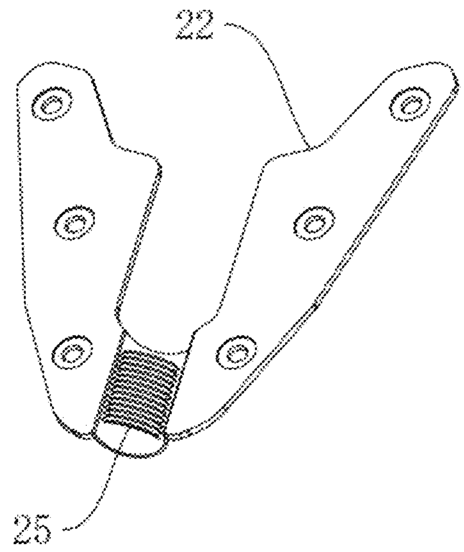
FIG. 5 is a schematic diagram of the external appearance of the second engaging member according to another embodiment of the invention.
Figure 6:
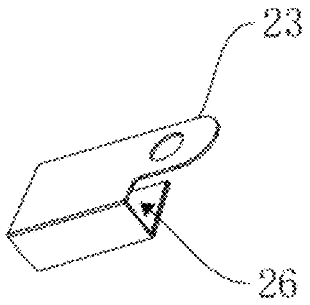
FIG. 6 is a schematic diagram of the external appearance of the limiting device according to an embodiment of the invention.
Figure 7:
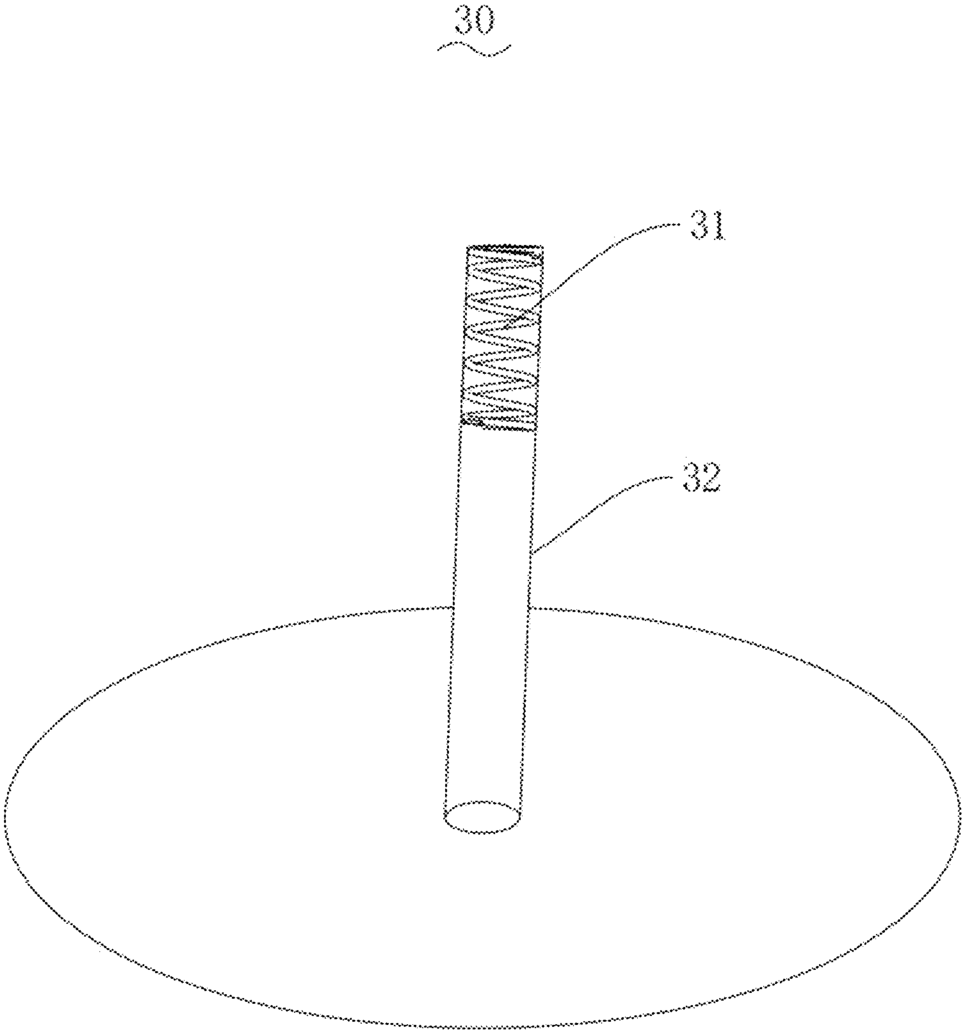
FIG. 7 is a schematic diagram of the external appearance of the base of a lighting fixture with a foldable lampshade according to an embodiment of the invention.

With reference to FIG. 1 to FIG. 7, an embodiment of the invention provides a lighting fixture 100 with a foldable lampshade 10, including a lampshade 10 and a light source assembly; the lampshade 10 includes a foldable semi-rigid sheet material, on which crease lines 11 for guiding folding are provided; edge areas 12 of the lampshade 10 abut and fit against each other in the unfolded state; the lighting fixture 100 further includes a connecting buckle 20, which includes a first engaging member 21 and a second engaging member 22 respectively disposed on two edge areas 12; the first engaging member 21 and the second engaging member 22 are mutually matched and clamped to lock and fix the connecting buckle 20 when the two edge areas 12 abut against each other; the light source assembly includes a plurality of LED beads disposed inside the lampshade 10.

In this embodiment, it should be noted that the semi-rigid sheet material has both a certain degree of flexibility to enable folding and sufficient structural strength to maintain the overall shape stability of the lampshade 10 after unfolding. The crease lines 11 can be formed by processes such as indentation, hot pressing, or die-cutting, facilitating users to quickly complete folding or unfolding operations along preset paths. The first engaging member 21 and the second engaging member 22 are disposed on the edge areas 12 of the lampshade 10, and their mechanical matching and clamping can effectively fix the edges together, improving the stability and appearance integrity of the lampshade 10 in the unfolded state, and avoiding deformation or misalignment caused by structural looseness during use. Meanwhile, a plurality of LED beads are arranged at different positions inside the lampshade 10, which not only realize the basic lighting function but can also form light and shadow effects through reasonable arrangement, enhancing the visual expressiveness and decorativeness of the lighting fixture 100.

The technical solution of this embodiment can achieve the foldability of the lampshade 10 and convenient assembly and disassembly, while ensuring the stability and aesthetics of the lighting fixture 100 during use. By adopting the semi-rigid sheet material, the lampshade 10 can maintain a certain degree of flexibility when folded, facilitating storage and transportation, and can maintain sufficient structural strength after unfolding to avoid shape deformation or instability caused by overly soft or insufficiently rigid materials. In addition, the provision of crease lines 11 makes the folding process of the lampshade 10 simpler, allowing users to quickly complete folding or unfolding according to preset paths, further improving use convenience.

The design of the connecting buckle 20, through the mechanical cooperation of the first engaging member 21 and the second engaging member 22, enables edges of the lampshade 10 to be firmly fixed, enhancing the stability and appearance integrity of the lampshade 10 in the unfolded state. This clamping structure not only improves the reliability of the lampshade 10 but also effectively avoids loosening or misalignment problems caused by frequent folding or unfolding during use. At the same time, the reasonable layout of the LED beads enables the lighting fixture 100 to achieve various light and shadow effects, enhancing the visual expressiveness of the lampshade 10, which not only meets basic lighting needs but also has a decorative function. These designs make the lighting fixture 100 with a foldable lampshade 10 of this embodiment have great advantages in both functionality and decorativeness, suitable for lighting fixture 100 products in different occasions and needs.

In a specific embodiment, the connecting buckle 20 includes a limiting device 23, and the limiting device 23 includes a groove 26; the groove 26 is adapted to an abutting surface of the buckle and is used to accommodate and limit the first engaging member 21 and the second engaging member 22 when they are clamped and matched.

In this embodiment, it should be noted that the limiting device 23 is disposed on the connecting buckle 20 to further improve the stability and anti-displacement capability of the clamping structure; the groove 26 can be formed by processes such as injection molding or mechanical processing, and its position and size are adapted to the structures of the first engaging member 21 and the second engaging member 22. During the clamping and matching process of the two, part of them can be embedded in the groove 26, thereby achieving effective positioning and limiting. This structure not only avoids sliding or misalignment during the clamping process but also enhances the retention capacity of the edge areas 12 of the lampshade 10 under stress, helping to improve the firmness and durability of the overall lampshade 10 during long-term use.

Optionally, abutting surface of the edge areas 12 is provided with anti-slip textures, which are micro-protrusions distributed in a staggered manner. In this embodiment, it should be noted that the abutting surface of the edge areas 12 is provided with anti-slip textures formed by staggered micro-protrusion structures, aiming to increase the friction during the matching of the connecting buckle 20 and ensure that the lampshade 10 can maintain a stable connection after unfolding. The micro-protrusion structure can be formed by processes such as injection molding or compression moulding, having good wear resistance and anti-sliding effects, effectively preventing the edge areas 12 of the lampshade 10 from sliding or loosening during use due to external forces. The design of the anti-slip textures not only enhances the fixation of the edges of the lampshade 10 but also improves the operational stability and safety during assembly or disassembly by users.

Further, the edge areas 12 of the lampshade 10 are provided with magnetic connection components, and magnetic poles of the magnetic connection components are arranged in opposite directions, magnetically attracting when the edge areas 12 abut against each other.

In this embodiment, it should be noted that the edge areas 12 of the lampshade 10 achieve a more convenient and reliable connection method through the magnetic connection components. The magnetic poles of the magnetic connection components are arranged in opposite directions, that is, one magnetic pole is a north pole and the other is a south pole. When the edge areas 12 of the lampshade 10 abut against each other, the magnetic attraction can quickly and firmly attract two edges together. This magnetic attraction design not only avoids the complicated operations of traditional buckle or threaded connection methods but also provides a more convenient and rapid assembly experience. Users only need to align the edge areas 12, and the magnetic force can automatically complete the attraction and fixation.

The design of the magnetic connection components ensures connection stability while avoiding possible loosening problems and providing convenience for disassembly. When needing to disassemble or fold the lampshade 10, users can easily separate the edges of the lampshade 10 with a gentle pull, without the need for tools, and the operation is simple. The magnetic connection components also have strong durability and anti-interference capabilities, maintaining good magnetic adsorption force even during long-term use, ensuring the structural stability and safety of the lampshade 10.

In an optional embodiment, an outer surface of the lampshade 10 is provided with decorative patterns or textures, which present different visual effects when the lampshade 10 is folded or unfolded. a plurality of LED beads are fixedly disposed at preset positions inside the lampshade 10 to form specific light and shadow effects when emitting light.

In this embodiment, it should be noted that the outer surface of the lampshade 10 is designed with decorative patterns or textures, presenting different visual effects during folding or unfolding. These patterns or textures can be processed by processes such as printing, embossing, or laser engraving, aiming to enhance the aesthetics and decorativeness of the lampshade 10. When the lampshade 10 is in different folded or unfolded states, the visual effects of the patterns or textures will produce dynamic visual expressions with shape changes. a plurality of LED beads are fixed at preset positions inside the lampshade 10 to ensure uniform light source distribution and form specific light and shadow effects inside the lampshade 10 through reasonable arrangement, enhancing the artistry of the lighting fixture 100 and the creation of spatial atmosphere. The combination of the design of patterns or textures and the lighting effects of the LED beads not only provides basic lighting functions but also creates unique light and shadow effects, enhancing users' usage experience.

In a specific embodiment, the lighting fixture 100 further includes: a base 30 provided with a support rod 32, wherein the support rod 32 is connected to the lampshade 10 to support the lighting fixture 100; or a hanging device to suspend the lighting fixture 100 at a preset position. When the first engaging member 21 and the second engaging member 22 are mutually clamped and matched, a cavity 24 is formed at a clamping position of the first engaging member 21 and the second engaging member 22; the cavity 24 is adapted to the shape of connection position between the base 30 or the hanging device and the lampshade 10, used to fix the lampshade 10 on the base 30 or the hanging device. The cavity 24 is provided with an internal thread 25, and a corresponding connection part of the support rod 32 or the hanging device is provided with an external thread 31 matching therewith.

In this embodiment, it should be noted that the design of the base 30 or the hanging device provides flexible installation methods for the lampshade 10, allowing users to select suitable usage scenarios according to actual needs. The base 30 design ensures that the lighting fixture 100 can be stably placed on a flat surface, while the hanging device is suitable for hanging installation, adapting to different spatial layouts and decoration needs. Through the cavity 24 formed when the first engaging member 21 and the second engaging member 22 are clamped and matched, the connection between the lampshade 10 and the base 30 or the hanging device is tighter. The shape and size of the cavity 24 match the external structure of the connection part, ensuring that the connection part will not loosen or deform due to external forces. The design of the internal thread 25 further enhances the connection stability. Through cooperation with the external thread 31 part on the base 30 or the hanging device, a more secure lock can be achieved, preventing any loosening or displacement of the lampshade 10 during use.

In addition, the threaded structure in the cavity 24 provides an accurate positioning function during assembly, making the connection between the lampshade 10 and the base 30 or the hanging device more efficient and stable. During installation, users can achieve a stable fixation effect by tightening the connection part, ensuring the stability and safety of the lighting fixture 100 during long-term use. This threaded connection method not only improves the overall structural strength of the lighting fixture 100 but also facilitates later maintenance and disassembly, further improving the practicality and convenience of the lighting fixture 100.

In a specific embodiment, the materials of the first engaging member 21 and the second engaging member 22 include metal or plastic. The material of the semi-rigid sheet includes one or more of polyester, polyvinyl chloride, polypropylene, cellulose fiber, or polyimide.

In this embodiment, it should be noted that the materials of the first engaging member 21 and the second engaging member 22 are selected as metal or plastic, aiming to provide different strength, weight, and cost balances according to actual needs. Metal materials have higher strength and durability, suitable for environments requiring withstanding heavy loads or long-term use; while plastic materials have the advantages of light weight, low cost, and easy processing, suitable for applications with light weight requirements or more sensitive production costs. According to different usage scenarios and manufacturing requirements, suitable materials can be flexibly selected to ensure the stability and reliability of the engaging members.

The semi-rigid sheet material include one or more of polyester, polyvinyl chloride, polypropylene, cellulose fiber, or polyimide, all of which have a certain degree of rigidity and flexibility, suitable for folding designs. Plastic materials such as polyester, polyvinyl chloride, and polypropylene have good processing performance and moldability, capable of manufacturing folding structures through injection molding or hot pressing; cellulose fiber has good environmental protection and recyclability, suitable for design needs focusing on sustainable development; while polyimide has excellent high-temperature resistance and chemical corrosion resistance, suitable for use in special environments. Selecting these materials can ensure that the semi-rigid sheet maintains good structural stability when folded, while also facilitating production, transportation, and later maintenance during use.

The above embodiments only represent several implementation modes of the present invention. Although their descriptions are specific and detailed, they should not be construed as limiting the scope of the invention. It should be noted that those of ordinary skill in the art can make several variations and improvements without departing from the concept of the invention, and these all fall within the protection scope of the invention.

What is claimed is:

1. A lighting fixture with a foldable lampshade, comprising a lampshade and a light source assembly;

the lampshade includes a foldable semi-rigid sheet material, on which crease lines for guiding folding are provided; edge areas of the lampshade abut and fit against each other in the unfolded state;

the lighting fixture further includes a connecting buckle, which includes a first engaging member and a second engaging member respectively disposed on two edge areas; the first engaging member and the second engaging member are mutually matched and clamped to lock and fix the connecting buckle when the two edge areas abut against each other;

the light source assembly includes a plurality of LED beads disposed inside the lampshade;

wherein the connecting buckle includes a limiting device, and the limiting device includes a groove; the groove is adapted to an abutting surface of the buckle and is used to accommodate and limit the first engaging member and the second engaging member when they are clamped and matched.

2. The lighting fixture with a foldable lampshade of claim 1, wherein the semi-rigid sheet material include one or more of polyester, polyvinyl chloride, polypropylene, cellulose fiber, or polyimide.

3. The lighting fixture with a foldable lampshade of claim 1, wherein abutting surface of the edge areas is provided with anti-slip textures, which are micro-protrusions distributed in a staggered manner.

4. The lighting fixture with a foldable lampshade of claim 1, wherein an outer surface of the lampshade is provided with decorative patterns or textures, which present different visual effects when the lampshade is folded or unfolded, a plurality of LED beads are fixedly disposed at preset positions inside the lampshade to form specific light and shadow effects when emitting light.

5. The lighting fixture with a foldable lampshade of claim 1, wherein the lighting fixture further includes:

a base, which is provided with a support rod, wherein the support rod is connected to the lampshade to support the lighting fixture; or a hanging device to suspend the lighting fixture at a preset position.

6. The lighting fixture with a foldable lampshade of claim 5, wherein when the first engaging member and the second engaging member are mutually clamped and matched, a cavity is formed at a clamping position of the first engaging member and the second engaging member; the cavity is adapted to the shape of connection position between the base or the hanging device and the lampshade, used to fix the lampshade on the base or the hanging device.

7. The lighting fixture with a foldable lampshade of claim 6, wherein the cavity is provided with an internal thread, and a corresponding connection part of the base or the hanging device is provided with an external thread matching therewith.

8. The lighting fixture with a foldable lampshade of claim 1, wherein the edge areas of the lampshade are provided with magnetic connection components, and magnetic poles of the magnetic connection components are arranged in opposite directions, magnetically attracting when the edge areas abut against each other.

9. The lighting fixture with a foldable lampshade of claim 1, wherein the materials of the first engaging member and the second engaging member include metal or plastic.

* * * * *